United States Patent [19]

Osintsev et al.

[11] 4,018,375

[45] Apr. 19, 1977

[54] METHOD OF MANUFACTURING A NONCONSUMABLE COPPER-ZIRCONIUM ELECTRODE

[76] Inventors: Vladislav Grigorievich Osintsev, ulitsa Lenina, 6, kv. 6; Jury Grigorievich Naumov, ulitsa Chapaeva, 5, kv. 11, both of Kolchugino Vladimirskoi oblasti; Eduard Migranovich Esibyan, ulitsa Kikvidze, 4, kv. 21, Kiev; Mikhail Evgenievich Danchenko, bulvar B.Likhacheva, 3, kv. 53, Kiev; Vasily Berkovich Malkin, prospekt Voroshilova, 31, kv. 305, Kiev, all of U.S.S.R.

[22] Filed: Mar. 5, 1976

[21] Appl. No.: 664,072

[30] Foreign Application Priority Data

Mar. 10, 1975 U.S.S.R. .............................. 2119847

[52] U.S. Cl. .................................. 228/131; 29/592; 228/154
[51] Int. Cl.² ......................................... B23K 31/00
[58] Field of Search ..................... 29/592; 219/145; 228/126, 127, 131, 154

[56] References Cited

UNITED STATES PATENTS 3,571,907  3/1971  Watson .............................. 228/131

3,905,828  9/1975  Barber ........................... 228/126 X

FOREIGN PATENTS OR APPLICATIONS 1,964,457  9/1970  Germany ........................... 228/131

*Primary Examiner*—Al Lawrence Smith
*Assistant Examiner*—James G. Smith
*Attorney, Agent, or Firm*—Lackenbach, Lilling & Siegel

[57] ABSTRACT

A method of manufacturing nonconsumable copper-zirconium electrodes in two stages. First, an intermediate layer of cold-deformed copper of a thickness substantially equal to the diameter of a zirconium core is cold deformed on the core. Second, a copper sleeve of an external diameter 5 to 15 times greater than the diameter of the core is hot deformed on to the first structure. Using this method ensures proper circular shape of the core in cross-section, reliability of the bond between the core and sleeve for operation of the electrode at temperatures in excess of 1000° C and at cooling water pressures as high as 10 atmospheres, high thermal and electric conductivity across the copper-zirconium interface, as well as fine technological effectiveness of the process to the conditions of large-scale production.

4 Claims, No Drawings

METHOD OF MANUFACTURING A NONCONSUMABLE COPPER-ZIRCONIUM ELECTRODE

The present invention relates to methods of manufacturing electrodes for metal-working with an electric arc and, more particularly, is related to methods of manufacturing nonconsumable copper-zirconium electrodes.

The invention can be used for manufacturing bi-metal articles of a considerable length, wherein the external diameter is 5 to 15 times as great as the diameter of the core, the jointed metals having different structures and displaying different plastic properties when worked by the application of pressure.

The present invention can be utilized to the utmost effectiveness in the manufacture of electrodes for air-plasma cutters, including a sleeve and a zirconium core. Copper is usually taken as the sleeve material, owing to its high heat and electric conductivity. For the material of the core there is usually taken either pure zirconium or one of its alloys with a small content of the alloyed metal, e.g. such alloys as Zr + 1% Nb. In the process of manufacturing said electrodes, at the first stage the sleeve and the zirconium core are prepared separately. Then the copper core is pressure-fitted into the blind bore of the sleeve without heating. However, the joint thus obtained fails to provide a reliable thermal and electric contact as there are gaps and clearances left between the two components, particularly, at the area of the end face of the core. The technological process is a labor-consuming one, which is particularly true of the operations connected with centering the core, with any mechanisation and automation of the production process being complicated, considering that the process involves producing the relatively short less than 4 mm) core by turning and accurately locating it in the sleeve. Therefore, the electrodes produced by the abovedescribed known technique have a service life which is insufficient for their industrial application, which has been reflected in the fact that plasmatrons with air stabilization of the arc have not been yet developed to the degree to which they are capable.

A known improvement of the abovedescribed technology is making entire electrodes of a bi-metal copper-zirconium blank, by drilling a bore in a massive sleeve and then fitting into this bore the zirconium core, while applying a relatively low pressure. The blank thus obtained is subjected to hot deformation and then cold-drawn to the final dimensions, whereafter electrodes are produced therefrom by turning the blanks in automatic lathes.

According to this known process, to effect air-tight sealing of the core, prior to the hot deformation the holes in the sleeve are closed with copper closures, whereafter the contact areas are finally closed by argon-arc welding. Disadvantages of said method consist in the following.

When the ratio of the diameters of the sleeve and of the zirconium core is within a 5 to 15 range, the large-sized sleeve is produced either by casting or by hot molding. It is commonly known, though, that copper produced by said methods has a non-uniform macro-crystalline structure, whereby the plastic properties of a blank made of such copper vary to a considerable degree at various areas of the blank. When the copper-zirconium blank is subjected to joint hot deformation, on account of the exhibition of the Theological properties of different metals (copper and zirconium) during their joint plastic flow there often takes place an unpermissible distortion of the core, viz. its cross-sectional area varies along the length of the blank and its shape in cross-section becomes either cross-like or, at the best, rectangular.

Additional difficulties are encountered when a deep (as deep as 120 to 150 mm) bore of a relatively small diameter (7 to 14 mm) is to be drilled in the copper sleeve, and the finish of the walls of the bore and the tolerance is to provide for a light pressure-fit of the core and its centering in the thick-wall sleeve. Labor-consuming operations are required for sealing the core by welding.

As a result of the variations of the cross-sectional area along the length of the blank at cold deformation, in many cases the core becomes ruptured at various intervals, According to still another known practice this problem is solved by using an intermediate layer and by selecting proper conditions of the subsequent deformation.

Thus, there is known a method of manufacturing a replaceable electrode, by producing a copper sleeve by turning, drilling therein a bore and pressure-fitting into this bore a zirconium core. However, this known method fails to provide a reliable thermal and electric contact between the zirconium and copper, since these metals, when heated to a temperature of 822° C, are insoluble in each other, and cold welding therebetween is of but a poor quality, whereby the strength of the electrodes produced by this method is both unstable and low, to say nothing of the difficulties encountered when large-series production of electrodes is to be based on this method.

There is yet another known method of joining a zirconium core with a sleeve by their joint deformation with an intermediate layer interposed. This known method includes locating the zirconium core and the intermediate layer in the copper sleeve. A disadvantage of said method consists in the fact that it is a labor consuming one. The components of the blank to be assembled are separately produced by turning and by individually fitting them to one another. To ensure an adequately high quality of the contact, the contact surfaces are machined to at least a Class 7 surface finish and are thoroughly degreased before the assembling, whereafter the end faces are sealed by welding in a protective gas atmosphere. In this case either end face caps or plugs made of copper are used.

A third metal is taken as the material of the intermediate layer. Said latter acting as an interface, of for example, during the hot deformation the metals of the core and of the sleeve form a low-melting eutectic, or else the intermediate layer acts as a solder. Thin intermediate layers are used, e.g. made of a foil or of a band. As a result of the subsequent deformation, the intermediate layer thins out and becomes accommodated between the metals being joined as a very thin interface, following the crystalline structure of the surface of the joint. Said known method is used when the ratio of the diameter of the sleeve to the diameter of the core is substantially less than 5:1. When the ratio required at the production of the electrodes is greater, the crystalline structure of the joint area becomes exhibited so considerably that the cross-section on the core acquires an irregular shape, and the variation of the cross-sectional area of the core along the length of a blank becomes as high as 50% of the rated value, the interface, of which the thickness in the deformed blank is but one tenth and less of the width of the serrated borderline between the core and the sleeve, failing to serve as the interface levelling out this borderline. As a result of the non-circular shape and non-uniform cross-sectional area of the core along the length of the blank, electrodes made of this blank have inadequately long service life, with the plasma jet being insufficiently stable, and the crater developed in the core likewise having an irregular shape. Further, the blanks for electrodes are subjected to machining either in turret lathes or by stamping. However, it is impossible to produce qualitative cathodes from the blanks according to the known method.

It is the main object of the present invention to provide a method of manufacturing a nonconsumable copper-zirconium electrode, which would ensure a proper circular shape of the core.

It is still another object of the present invention to provide a method of manufacturing a nonconsumable copper-zirconium electrode, which would ensure a reliable bond between the core and the sleeve.

It is still another object of the present invention to provide a method which would ensure high thermal and electric conductivity across the copper-zirconium interface and which would be easily adaptable to the conditions of mass production of electrodes.

These and other objects are accomplished in a method of manufacturing a nonconsumable copper-zirconium electrode, by locating zirconium core within a copper sleeve with an intermediate layer therebetween and then deforming the blank thus obtained and subsequently machining it, in which method, according to the present invention, the intermediate layer is of a thickness substantially equal to the diameter of the core and is made of cold-deformed copper, the deformation of the blank being effected consecutively by, first, cold deformation of the intermediate layer on the core and, then, their hot deformation jointly with the sleeve.

With the intermediate layer having a thickness substantially equalling the diameter of the core, it becomes possible to attain a cross-sectional shape of the core which for every practical reason does not differ from a circle. This substantial equality of the thickness of the intermediate layer and the diameter of the core is aimed at levelling out the conditions of the mutual influence of the structures of zirconium and copper upon the formation of their contact zone or interface, as well as at completely eliminating the influence of the macro-crystalline structure of the copper sleeve upon this contact area.

Increasing the thickness of the intermediate layer still further has been found unsuitable, because when the ratio of the external diameter of the intermediate layer to its thickness is greater than 3:1 it becomes virtually impossible to fit snugly the intermediate layer about the zirconium core by means of cold deformation. It is commonly known that when a thick-wall tube with the said ratio being greater than 3:1 is subjected to free upsetting or swaging (i.e. upsetting without a mandrel), the thickness of the wall decreases on account of the absence of a rational extension strain adjacent to the internal surface of the tube. Therefore, in such a case the upsetting of the diameter is to a considerable degree compensated for by the thinning out of the wall.

An additional advantage of the use of the intermediate layer is that the bore which is to be drilled in the massive copper sleeve is three times as great as the one that is to be drilled when no intermediate layer is used. Furthermore, it is no longer necessary to ensure the high accuracy and fine finish of the internal surface of the bore, since with the intermediate layer interposed, these factors do not influence at all the formation of the contact area and the shape of the core. Moreover, the copper sleeve forms a quality joint with the intermediate layer during hot deformation even when the surfaces are not specifically prepared in advance. With copper used as the intermediate layer, a high thermal and electric conductivity of an electrode is provided, while the cold-deformed structure of the copper of the intermediate layer is responsible for the finely crystalline structure of the surface of the contact.

For no re-crystallization process to take place in the intermediate layer and for the surface layers of the zirconium core to positively contact the finely crystalline structure of this layer, it is expedient that the heating prior to the hot deformation should be of a short duration, e.g. induction heating. When processed under such conditions, the width of the contact area (the "serration") in the zirconiumcopper bi-metal is minimized and practically does not affect the cross-sectional shape of the core, which shape does not practically differ from a circle in the hot-deformed blank. By developing the surface of the contact, the finely crystalline relief provides for a strong mechanical bond between the core and the intermediate layer.

To exclude the specific operations of sealing away the core and to reduce the amount of labor consumed during the manufacture of electrodes in the herein disclosed method, the deformation of the blank is effected in successive steps. The joint cold deformation of the intermediate layer on the core, owing to the high compression forces characteristic of the cold deformation technique, ensures snug, pre-strained, clearance-free connection of the zirconium and copper bodies and retains the cold-deformed structure of the metal of the intermediate layer. During the subsequent short-duration induction heating this clearance-free connection prevents oxidation of the surface of the core, experience showing that merely slight oxidation can be detected following the heating exclusively adjacent to the end face, to a 5 to 10 face, to a 5 to 10 mm distance from the face. These end portions of the blank go to waste anyway at the subsequent processing. The consecutive hot deformation under the action of high temperatures and pressures, together with the renovation and development of the contact surface resulting from the deformation, ensures a metallurgical bond between the core and the intermediate layer.

It is most expedient from the technological point of view to effect the cold deformation of the intermediate layer on the core by drawing with a degree of deformation providing for a clearance-free, pro-strained joint.

The advantages of cold drawing, i.e. its high productivity the possibility of obtaining elongated articles with a surface finish not less than Class 7, the stability and high accuracy of the size longitudinally of the article, the adequately high compressing effort for obtaining a clearancefree joint, as well as the retaining of the concentricity of the cross-sections of the blank, cannot be obtained by other cold deformation techniques, e.g. by rolling or rotational forging.

It is further expedient that the hot deformation should be effected by compression at a temperature of about 650° C to 750° C with subsequent drawing of the blank to a degree of deformation within 15% to 40%, to a diameter substantially equal to the diameter of the electrode to be manufactured.

The high compressing effort brought about by the compression provides for reliable joining of the layers of the bimetal blank, and the concentricity of the cross-sections is retained, like at cold drawing. The strength and plastic properties of zirconium, particularly those of alloys of zirconium with a small amount of the alloying elements, are considerably different from those of copper at room temperatures. However, with a temperature increase, the difference between the properties diminishes and attain its minimum within a range of temperatures about 650° C to 750° C. Therefore, the said temperature of compression is optimal. The upper temperature limit is due to the fact that at a higher temperature under the hot compression conditions zirconium and cold-deformd copper undergo recrystallization. As a result of the growth of the grain at recrystallization, the distortion of the cross-sectional shape of the core is increased to a degree that cannot be tolerated, because the width of the serrated zone of the joint depends predominantly on the size of the grains of the metals being joined. By the serrated zone of the joint is meant the maximum difference between the respective radii of the peaks and valleys of the contact surfaces of the layer and the core. Besides, at temperatures above 750° C the strength of both copper and zirconium becomes so low that the turbulent motion of the metals in the heart of deformation becomes so considerable that the cross-section of the core in the blank after the compression is non-uniform along the length of the blank.

Still another limitation of the temperature of the range is the fact that at the temperature of 862° C copper and zirconium form a low-melting eutectic.

It is commonly known that the safety margin in the case of temperatures of this kind is preferably about 100° C, so that the high pressures and heat generated by the deformation themselves would not lead to the formation of the eutectic at lower temperatures.

The bottom temperature limit is explained by the increased non-uniformity of the deformation on account of the difference between the strength and plastic properties of copper and zirconium increasing with the temperature decrease, as well as by the known phenomenon of the quality of the joining of layers of different metals becoming poorer at lower temperatures and by the necessity of using presses with extra-high effort value, when a temperature is low.

To reduce the production cycle of electrodes, it is expedient that the subsequent drawing of a compressed blank be carried out with the degree of deformation within 15% to 40%, to a diameter substantially equal to that of the electrode to be made. The lower limit of this deformation range is explained by the necessity of attaining a uniform colddeformed structure of the entire cross-section of the blank. It is known that hot-deformed copper is too soft and poorly machined, whereas cold-deformed copper is stronger and can be machined to better results. Further, there is required a certain degree of deformation by drawing to straighten out the compressed blank, to reduce the diameter tolerance down to 0.1 – 0.2 mm and to obtain a surface finish not poorer than Class 7. On the other hand, when the drawing is carried out with the degree of deformation in excess of 40%, on account of the difference between the strength and plasticity or the copper and zirconium and the unlucky ratio of the volumes of the core and of the sleeve, the extension strain which is at its maximum adjacent to the axis of the blank results in the core displaying a tendency to break and to form throat portions, as if being extended. With the bi-metal blank obtained having a diameter substantially equal to that of the electrode to be made and a fine surface finish together with the cold-deformed structure of the copper body, it becomes possible to manufacture electrodes in automatic machines without any consecutive removal of the surface layer.

To standardize to an optimal degree and technology of manufacturing the electrodes of the entire size range that may be required and to provide for making electrodes from a continuous blank, the ratio of the diameter of the copper sleeve to the diameter of the core is preferably within the range of about 5 to 15.

The present invention will be further described in connection with an example of its implementation.

Disclosure is made of a method of manufacturing a nonconsumable copper-zirconium electrode, according to which a zirconium core is placed within a thick-wall copper sleeve, with an intermediate layer disposed between the sleeve and the core. The assembled three-component blank is deformed and then machined. The intermediate layer is of a thickness substantially equal to the diameter of the core, to level out the conditions of the inter-influence of the structures of the copper and zirconium bodies upon the formation of the contact zone, and also to preclude the influence of the macrocrystalline structure of the copper sleeve upon this contact zone. For the intermediate layer there is taken cold-deformed copped, which provides for a high thermal and electric conductivity of the electrode, while the cold-deformed structure of the copper provides for a finely-crystalline relief of the contact surface.

To exclude the specific operations of sealing away the core and to reduce the amount of labor involved in the manufacture of the electrodes, the deformation of the blank is carried out in successive stages. The joint cold deformation of the intermediate layer on the zirconium core provides for the pre-strained clearance-free joining of the copper and zirconium and for the retaining of the cold-deformed structure of the intermediate layer. The pre-strained joining retains during the subsequent heating of the blank an adequately sealed away state of the zirconium core, not-withstanding the fact that the thermal expansion factor of copper is more than twice that of zirconium. The cold-deformed copper-zirconium blanks are then cut to lengths to be placed inside thick-wall copper sleeves by fitting under a slight pressure. The subsequent hot deformation provides for a tight metal bond of the core with the intermediate layer and of the latter with the sleeve.

The cold deformation of the intermediate layer on the core is carried out according to the presently described embodiment of the method by drawing to a degree of deformation sufficient for obtaining the clearance-free pre-strained joint.

The subsequent hot deformation of the assembled threecomponent blank is carried out at a temperature form 650° C to 750° C, with consecutive drawing of the blank with a degree of deformation within 15% to 40%, to a diameter substantially equal to that of the electrode to be made. The thus produced elongated blanks have a fine surface finish and an adequate concentricity of the core, which enables the manufacture of electrodes from a continuous blank having an external diameter 5 to 15 times as great as the diameter of the core.

For the present invention to be still better understood, there follow hereinbelow more concrete examples of its implementation.

A blank of hot-pressed copper 87 mm in diameter and 150 mm long is taken, and a 20 mm diameter bore is drilled therein in an automatic lathe. To improve the finish of the surface, to reduce the variation of the wall thickness resulting from the deep drilling to ±0.7 mm and to ensure the required diameter tolerance of the blank, the latter is turned to a 84 mm diameter. Thus, there is produced a copper sleeve 84 mm in diameter and 150 mm long, with a 20 mm diameter central bore.

A thick-wall copper tube produced by hot pressing and subsequent rolling without intermediate annealing, 24=7.5 mm in diameter (i.e. the external diameter is 25 mm and the wall thickness is 7.5 mm), is taken to serve as the intermediate layer. Zirconium cores 6.8 mm in diameter are located in this tube, and the assembly is cold-drawn in a single pass to a 20 mm external diameter. The clearance-free joint is produced by this drawing, owing to the upsetting of the copper tube from the 24 mm diameter to the 20 mm one and to the wall thinning from 7.5 mm to 7.1 mm.

The thus obtained copper-zirconium blanks 20 mm in diameter are cut into 150 mm lengths which are fitted under a slight pressure into the copper sleeves.

A three-component blank thus obtained is induction-heated to 700° C and then compressed into a blank 15 mm in diameter. To rremove the scale, the hot-pressed blanks are pickled, whereafter they are drawn in a drawing mill with a 30% degree of deformation to a 12.5 mm diameter, the zirconium core thinning down to a 1.0 mm diameter.

The pulling end portion is then cut off the blank; the latter is trued in a trueing machine, whereafter electrodes are made therefrom by turning in turret lathes.

According to the herein disclosed method, there has been developed a production flow diagram for manufacturing the five sizes of the electrodes required by the apparatus for airplasma cutting of metals, namely 12.5 by 1.0 and 1.5, and 18.0 by 2.0, 2.5 and 3.0 mm, where 12.5 and 18.0 are the external diameters of the electrodes and 1.0, 1.5, 2.0, 2.5 and 3.0 are the diameters of their cores.

The production of the entire range of the electrodes has been standardized. The difference is only in their sizes. Therefore, the above example of manufacturing a 12.5 by 1.0 electrode is considered to be quite sufficient for the present disclosure. To produce other sizes, it is required merely to alter the transverse dimensions.

As a result of the implementation of the disclosed method, electrodes are manufactured having a long life of service for plasma-cutting of various metals and alloys. The microstructural analysis of the bond between the copper and zirconium has indicated the presence of a metallurgincal bond. The cross-section shape of the core practically does not differ from a circle, and the joint between the copper and zirconium bodies is effected along a highly developed finelycrystalline surface, which becomes obvious when the core is exposed by etching away the copper. Owing to the high-quality bond between the copper and zirconium and to the accurate concentricity of the core in the sleeve, there is attained a stable plasma arc with uniform burning away of the zirconium core. The number of actuations without electrode replacement becomes above 400 to 500, at a nominal thermal load of the cutter. The production of electrodes by the disclosed method is readily susceptible to mechanisation and automation and can be performed by commonly available equipment. The amount of labor consumed during the manufacture of electrodes by the herein disclosed method is less than one third of that of the previously existing manufacturing technique. For the first time in the world's practice, the herein disclosed method provides for setting up a large-series production of electrodes for air-plasma cutters.

What we claim is:

1. A method of manufacturing a nonconsumable copperzirconium electrode comprising the steps of: positioning within a copper sleeve a zirconium core and an intermediate layer to form a three-component blank, said intermediate layer being made of a cold-deformed copper and having a thickness substantially equal to the diameter of said core; deforming said three-component blank, the deformation of said three-component blank being performed successively by, first, joint cold deformation of said intermediate layer on said core and, then, by their hot deformation jointly with said sleeve; and subjecting the thus produced blank to machining, following the said deforming operations.

2. A method as set forth in claim 1, wherein the cold deformation of said intermediate layer on said core is carried out by drawing with a degree of deformation sufficient for obtaining a clearance-free pre-strained joint therebetween 3. A method as set forth in claim 1, wherein the hot deformation is performed by compression at a temperature from 650° C to 750° C, with subsequent drawing of the blank with a degree of deformation from 15% to 40%, to a diameter substantially equal to that of the electrode.

4. A method as set forth in claim 1, wherein the copper sleeve is of a diameter which is 5 to 15 times as great as the diameter of said core.

* * * * *